(12) United States Patent
Shanmugasundaram

(10) Patent No.: US 12,153,782 B2
(45) Date of Patent: Nov. 26, 2024

(54) PERSONALIZING USER EXPERIENCE WITH NEURAL FITTED Q ITERATION

(71) Applicant: Dell Products, L.P., Round Rock, TX (US)

(72) Inventor: Priya Shanmugasundaram, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 888 days.

(21) Appl. No.: 17/225,630

(22) Filed: Apr. 8, 2021

(65) Prior Publication Data
US 2022/0326840 A1   Oct. 13, 2022

(51) Int. Cl.
| | | |
|---|---|---|
| *G06F 3/0482* | (2013.01) | |
| *G06F 3/0481* | (2022.01) | |
| *G06F 3/04842* | (2022.01) | |
| *G06N 3/045* | (2023.01) | |
| *G06N 3/08* | (2023.01) | |

(52) U.S. Cl.
CPC ........ *G06F 3/04842* (2013.01); *G06F 3/0481* (2013.01); *G06N 3/045* (2023.01); *G06N 3/08* (2013.01)

(58) Field of Classification Search
CPC ..... G06F 3/0481; G06F 3/04842; G06N 3/08; G06N 3/092
See application file for complete search history.

(56) References Cited

PUBLICATIONS

Zhang, Yang, et al. "How to retrain recommender system? A sequential meta-learning method." Proceedings of the 43rd International ACM SIGIR Conference on Research and Development in Information Retrieval. 2020. (Year: 2020).*

Sundström, Johan. "Behavioral targeting in e-commerce through the use of reinforcement learning." Dissertation. (2019). Retrieved from https://urn.kb.se/resolve?urn=urn:nbn:se:kth:diva-265003 (Year: 2019).*

Riedmiller, Martin. "Neural fitted Q iteration-first experiences with a data efficient neural reinforcement learning method." Machine Learning: ECML 2005: 16th European Conference on Machine Learning, Porto, Portugal, Oct. 3-7, 2005. Proceedings 16. Springer Berlin Heidelberg, 2005. (Year: 2005).*

(Continued)

*Primary Examiner* — Benjamin P Geib
(74) *Attorney, Agent, or Firm* — Amin, Turocy & Watson, LLP

(57) ABSTRACT

Machine learning techniques can be implemented to provide personalized websites. In an example, a group of training inputs is determined. A training input of the group of training inputs can comprise a current state that indicates a visit to a website via a user device, an action that indicates a recommendation rendered via the user device during the visit to the website, a user reward that indicates whether user input associated with a user identity via the user device interacted with the recommendation, and a next state that indicates a state of the website for the user device in response to the action being taken from the current state. The training inputs can be used for performing batch offline neural fitted Q iteration training on a neural network to produce a trained neural network. The trained neural network can be stored.

20 Claims, 11 Drawing Sheets

(56) References Cited

PUBLICATIONS

D. Ernst, P. Geurts, and L. Wehenkel. "Tree-based batch mode reinforcement learning". Journal of Machine Learning Research, 6:503-556, 2005.
P. Pfeifer and R. Carraway. "Modeling customer relationships as markov chains". Journal of interactive marketing, 34 pages, 2000.
G. Theocharous and A. Hallak. "Lifetime value marketing using reinforcement learning". In the 1st Multidisciplinary Conference on Reinforcement Learning and Decision Making, 2013, 5 pages.
Theocharous, Georgios et al. "Personalized Ad Recommendation Systems for Life-Time Value Optimization with Guarantees." IJCAI (2015) 7 pages.
Riedmiller M. "Neural Fitted Q Iteration—First Experiences with a Data Efficient Neural Reinforcement Learning Method", Machine Learning: ECML 2005, 12 pages.
R. Sutton and A. Barto. "Reinforcement Learning: An Introduction". MIT Press, Cambridge, MA, 1998, 551 pages.
K. Madadipouya and S. Chelliah. "A Literature Review on Recommender Systems Algorithms, Techniques and Evaluations", BRAIN: Broad Research in Artificial Intelligence and Neuroscience, vol. 8, Issue 2, Jul. 2017, 16 pages.

\* cited by examiner

400

402

PERSONALIZING USER EXPERIENCE WITH NEURAL FITTED Q-ITERATION COMPONENT 408

Inputs: a batch of transitions $D$, in the form of four-tuples $(s, a, r, s')$ describing user visits to website
Outputs: Q-value function $Q_N$
Initialization:
    Set $k = 0$
    Set initial Q-value function $Q_0$ to zero across $S \times A$
Iterations:
    Repeat until convergence criteria or stopping conditions ($k > N$) are met
        Generate training patterns $P = \{(input_l, target_l), l = 1, 2, ..., \#D\}$ where:
            $input_l = (s_l, a_l)$
            $s_l = (g_l^1, g_l^2, ..., g_l^m)$, where $m$ denotes number of state features used to represent visit to website
            $a_l = a$, where array[a] fetches a sequence of recommendations to be shown of the form $(oc_l^1, oc_l^2, oc_l^3, oc_l^4)$ from an array of all possible permutations of recommendation sequences based on product order codes (oc).
            $target_l = r_l + \gamma * max_b(Q_k, b)$ where $b$ represents all possible actions
    Train Artificial Neural Network to induce from training patterns P (input, target) the Q-function $Q_N$
        $k = k + 1$
Store trained Artificial Neural Network and generate recommendations.

FIG. 4

PERSONALIZING USER EXPERIENCE WITH NEURAL FITTED Q ITERATION

BACKGROUND

Personalized services can be offered to users based on their preferences. Tools like recommender systems can be used to help users in making decisions by offering different items and options. There are various techniques to model a relationship between customer behavior and preferences. Examples of such techniques are collaborative filtering and content based filtering. Some recommendation systems can utilize a hybrid approach that utilizes both content based filtering and collaborative filtering techniques.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can determine a group of training inputs. A training input of the group of training inputs can comprise a current state that indicates a visit to a website via a user device, an action that indicates a recommendation rendered via the user device during the visit to the website, a user reward that indicates whether user input associated with a user identity via the user device interacted with the recommendation, and a next state that indicates a state of the website for the user device in response to the action being taken from the current state. The system can use the training inputs for performing batch offline neural fitted Q iteration training on a neural network to produce a trained neural network. The system can store the trained neural network.

An example method can comprise determining, by a system comprising a processor, a group of training inputs, a training input of the group of training inputs comprising a current state that indicates a first user interaction with a user interface, an action that indicates a recommendation displayed via the user interface during the first use interaction with the user interface, a reward that indicates whether a second user interaction with the recommendation, and a next state that indicates a state that is transitioned to from the current state in response to the action being taken. The method can further comprise performing, by the system, batch offline neural fitted Q iteration training on a neural network using the group of training inputs to produce a trained neural network. The method can further comprise saving, by the system, the trained neural network in a memory.

An example non-transitory computer-readable medium can comprise instructions that, in response to execution, cause a system comprising a processor to perform operations. These operations can comprise determining a group of training inputs, respective training inputs of the group of training inputs comprising respective current states that indicates respective first interactions via respective user interfaces, respective actions that indicate respective recommendations rendered via the respective user interfaces, respective rewards that indicates whether the respective second interactions with the respective recommendations occurred, and respective next states that are transitioned to in response to the respective actions being taken. These operations can also comprise performing batch offline neural fitted Q iteration training on a neural network using the group of training inputs to produce a trained neural network.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates another example system architecture for training using neural fitted Q iteration that can facilitate personalizing user experience with neural fitted Q iteration, in accordance with certain embodiments of this disclosure;

DETAILED DESCRIPTION

Overview

Figure 1:
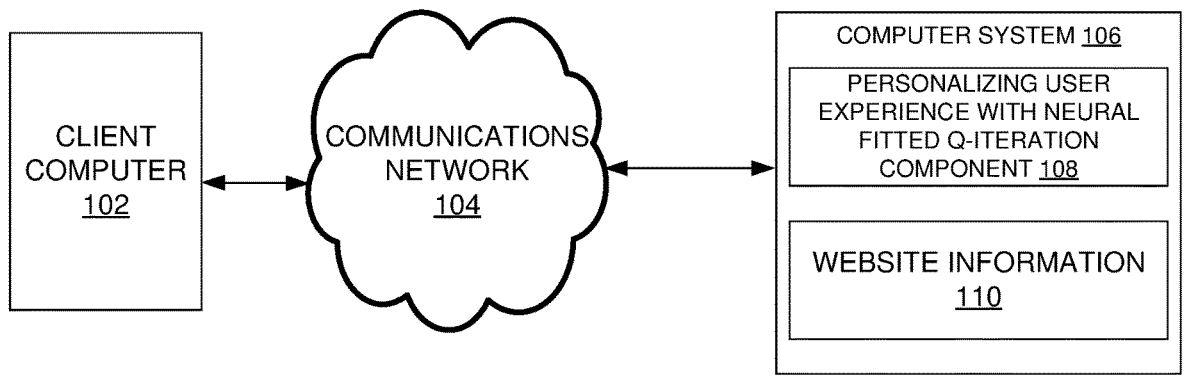
FIG. 1 illustrates an example system architecture that can facilitate personalizing user experience with neural fitted Q iteration, in accordance with certain embodiments of this disclosure.

There can be problems with content based filtering and collaborative filtering techniques, such as cold start, over specialization, and short-sightedness. The present techniques can avoid such problems.

Personalization can aid in delivering content and functionality of interest to a user with minimal effort from a user by adjusting a user interface according to a user persona. A user persona can be determined based on historical clickstream data, transaction data, or surveys, and demographic information. These can be digital traces left behind by a user that can be used to distinguish between users and enhance a user experience on a website. While some examples described herein involve personalizing websites, it can be appreciated that embodiments of these techniques can be more generally applied to personalization efforts in other contexts.

Prior approaches to personalization have included those that use rule-based targeting. In these approaches, data describing a user profile can be collected and manually mined for rules. These rules-based approaches can be static, so are unable to adapt to a customer's changing interests and cannot identify relationships between features that are not apparent to the human eye.

With the advent of supervised and unsupervised machine learning techniques, customer profiles can be identified better, which can improve personalization compared to rule-based techniques.

Reinforcement learning (RL) can generally involve a type of machine learning. As opposed to learning through the use of labeled datasets, like with supervised learning, reinforcement learning techniques can learn through interactions with the environment. Reinforcement learning techniques can consider an importance of sequential decision making and long-term effects of customer actions.

Techniques according to the present disclosure can involve an offline reinforcement-learning-based personalization system, which can solve problems that exist in rules-based techniques, and supervised and unsupervised learning systems.

The present techniques can be model independent. That is, these techniques can avoid making assumptions about the environment (e.g., user interactions with a website). These techniques can avoid modeling a probability distribution of transitions from one state to another (where there are probability distributions over possible actions that a customer can take).

The present techniques can be non-myopic. Unlike contextual bandits or other supervised/unsupervised learning techniques that can be greedy, the present techniques can optimize a long-term effect of recommendations on users. These techniques can do so by considering user visits in a sequential order to form an episode of user interaction.

The present techniques can be simple. These techniques can avoid making assumptions about the data, unlike prior techniques that can assume that visits to a website (or other resource) are independent and identically distributed, and do not distinguish between new visitors and returning visitors. The present techniques can also avoid assuming the presence of a reward function or model.

The present techniques can be simulator free. The present techniques can avoid using a simulator, as prior reinforcement learning techniques do. Simulators can be hard to create for dynamic systems due to the large number of states and actions.

The present techniques can be flexible. Features of a solution, like states, actions, and rewards, can be chosen or designed in such a way that different optimization goals can be achieved with minimal change. A reward can be modeled differently to optimize various objectives that arise for diverse problems.

The present techniques can provide superior performance. The present techniques can be mathematically founded to converge faster than online reinforcement learning controllers to an optimal policy, and by extension perform better than traditional controllers, with much less knowledge about the dynamics of a website and customer behavior.

The present techniques can offer data efficiency. They can be utilized to learn optimal policies successfully from a relatively low number of training samples. These techniques can also avoid the overhead of data preprocessing, as they can be used to learn directly from real-world interactions.

Reinforcement learning can comprise a subset of machine learning techniques, such as supervised and unsupervised learning. In contrast to supervised and unsupervised learning, which can learn through labeled data sets, reinforcement learning techniques can involve learning dynamically through interactions with the environment. In some examples, a reinforcement learning problem can be modeled as a Markov Decision Process (MDP). A MDP can be described by a set of states S, a set of actions A, a stochastic transition function $p(s,a,s')$ that describes stochastic system dynamics, and a reward function R: $S \times A \rightarrow \mathbb{R}$ These rewards can be utilized as feedback on an action taken by an agent. An agent can learn in a way that good actions are encouraged while bad actions are penalized through the rewards. A goal can be to find an optimal policy that maximizes expected rewards for each state.

However, online reinforcement learning systems can require a simulator, where an agent can take actions and be transitioned into a new state to learn optimal behavior. A simulator can be difficult to create for applications like these, due to an overwhelming complexity caused by offline modeling of behavior of different users on a website. This can be a drawback that prevents some reinforcement learning systems from being deployed in real time.

A solution to this problem of complexity can be to use batch or offline reinforcement learning techniques that retain benefits of reinforcement learning techniques and an ease of supervised or unsupervised learning techniques. These batch reinforcement learning techniques can be viewed in contrast to other techniques, such as collaborative filtering techniques and contextual bandit techniques.

In collaborative filtering, items can be selected based on correlations between a current user and other users of a given product or service, such as a website. The user can be compared to other users and similar user groups can be identified. Based on interests of similar users, recommendations can be provided to the active user. This approach can be implemented without depending on content.

In content based filtering techniques, items can be recommended to a user based on a relation between items and customer preferences. User behavior can be tracked, and based on history and interaction, appropriate items can be recommended to a user.

A problem with collaborative filtering and content based filtering techniques can be that they suffer from drawbacks like cold start, where a recommender system needs a reasonable amount of information before generating relevant recommendations. Because of this cold start issue, some recommender systems can be unable to provide recommendations to new users and for new content.

These collaborative filtering and content based filtering techniques can also suffer from over specialization, where a recommender system recommends only products of customer interest that can include already-purchased items. This can be because the recommender system fails to generate new or random recommendations.

Contextual bandit techniques can be used for personalization of user experience. Contextual bandit techniques can achieve personalization by dynamically learning about the performance of different recommendations based on instantaneous user interactions with those recommendations. These techniques can use exploration to circumvent an over-specialization problem as in collaborative filtering and content based filtering techniques.

Contextual bandit techniques can have a problem of being myopic as they work toward optimizing only the immediate reward. This can cause such techniques to ignore a long-term effect of customer interactions with the recommendations. Thus, contextual bandit techniques can be incompetent for a case of returning users.

In contrast, batch reinforcement learning techniques can generally comprise a subset of reinforcement learning techniques. Batch reinforcement learning can utilize dynamic programming With batch reinforcement learning, batches of transitions can be used to learn a solution—e.g., an optimal policy that maximizes a sum of expected rewards.

In some examples, there can be three phases in a batch reinforcement learning task—exploration, learning, and application. In an exploration phase, transitions in the form of (current state, action, reward, next state) can be collected from a real or simulated environment using a random sampling strategy. In a learning phase, the optimal policy can be learned from the transition data. In an application phase, the learned policy can be used to generate output.

The present techniques can involve using a batch reinforcement learning approach—a neural fitted Q iteration—to develop user personalization, such as a personalized web service. The personalization can be accessed by a user and lead to an increase in a customer lifetime value, revenue, and/or clickthrough rates in a user interface. The personalization can take the form of things such as product recommendations and deal banners.

The present techniques can utilize a batch reinforcement learning technique—neural fitted Q iteration—to develop a personalized experience for a user, such as a personalized web service. These techniques can have advantages for personalization.

A neural fitted Q iteration (NFQ) technique can utilize artificial neural networks, to model a Q-value function—e.g., an action value function that is based on available transition data.

In online Q-learning techniques, a network can be updated for every sample, and this can cause an agent to converge to an optimal policy after experiencing many episodes, such as tens of thousands of episodes. As updates are performed, the target to be optimized becomes non-stationary. This can cause unpredictable changes across the state and action spaces. These unpredictable changes can cause learning process to be slow and unreliable.

With a neural fitted Q-iteration technique, instead of updating a neural network representing a Q-value function online, updates can be performed offline while considering an entire batch of transitions. This approach can be an advantageous compared to online descent techniques, as they can be reliable, easier to use and can converge faster.

In a neural fitted Q iteration technique, first a training set P can be generated for a neural network from a batch of transition samples D. The training set can be of the form (input, target), where the input is a tuple comprising the state and action. The target can be computed by a sum of a current estimate of a Q-function (which can be a tail distribution function of the standard normal distribution). This generated training set P can then be passed onto an artificial neural network. Thus, an artificial neural network can model a Q-value function based on the batch of transitions.

Personalization according to the present techniques utilizing reinforcement learning can involve defining a Markov decision process that specifies a state, an action, and a reward.

A state denoted by $s_t$ can be a feature vector that describes a user's $t^{th}$ visit to a website (or other interaction). The state can comprise features such as a recentness of visit, a recurrence of visit, a time and day of the visit, and other demographic information about the user. Some of these features can include: lifetime visit number (a number of visits made to a particular website until now); day of the week (e.g., Monday), device type (e.g., mobile, personal computer, or tablet), hour of the day, location (e.g., latitude and longitude), operating system, last interaction (a reward when the user interacted with recommendations generated during a last visit), sum last interaction (a sum of rewards generated through interactions), user demographic information (user-related information such as age, gender, income, etc.), last purchase (revenue generated by the user's last purchase), time spent on site (an average amount of time spent on the website), and action count (a counter that tracks a number of times particular recommendations were shown).

An action $a_t$ can be defined as recommendations shown to a user at the $t^{th}$ visit to the website. An action can comprise a four-element (or n-element) tuple where a different permutation of available products (referenced by their order code) is considered a new action. Using the four-element example, an action space can be discrete because a number of four-element tuples that can be formed out of a set of available products is finite.

A policy $\pi_t$ can comprise a mapping from states to actions that denote a probability of taking an action $a_t$ in state $s_t$. An aim can be to learn an optimal policy that maximizes expected rewards, which can be user clicks on recommendations (using the website example).

A reward $r_t$ can be binary—0 when a user does not click on generated recommendations, and 1 when the user does click on the recommendations. In some examples, a reward can also be a linear function, such as $(v+\alpha*t_{avg})$, where v can be the frequency of the user visit, $t_{avg}$ can be the average time spent by the user on the website and $\alpha \in \mathbb{R}$ is a coefficient that represents the relative importance of $t_{avg}$ compared to v. Where a user visits almost T times (which will be the horizon/time-period), a trajectory of a customer can be stated as:

$$R(\tau)=\{s_1,a_1,r_1,s_2,a_2 \ldots s_T,a_T,r_T\}$$

And a return on this trajectory can be stated as:

$$R(\tau) = \sum_{t=1}^{T}\gamma^{t-1}r_t, \gamma\epsilon[0, 1]$$

Reward and actions can be modeled in different ways to optimize for different objectives. For example, weights can be utilized to model different aspects like revenue, time spent on the site, etc. as reward. So, different embodiments can be customizable to different optimization objectives.

A dataset can comprise many complete trajectories of customer interactions with a website, where a tuple of products was shown as a recommendation. A dataset of N trajectories can be denoted as D, in the following form:

$$D=\{F_t\}_{n=1}^{N}$$

Where for each trajectory n, $F_t^{(n)}$ can comprise state variable $s_t$, action variable $a_t$, reward $r_t$, and a next state variable $S_{t+1}$.

$$F_t^{(n)}=\{(s_t^{(n)},a_t^{(n)},r_t^{(n)},s_{t+1}^{(n)})\}_{n=0}^{N}$$

In some examples, neither the dynamics nor the true reward distribution is considered known. Rather, sampled values of rewards and actions can be used.

A high-level view of a training procedure for a personalization system using neural fitted Q iteration can be as follows. This approach can be utilized to incrementally generate data patterns and learn until convergence criteria are met.

The present techniques can provide for a batch reinforcement learning based personalization system that uses neural fitted Q iteration techniques. The present techniques can be utilized to generate personalized content for users to enhance user experience, and are capable of catering to returning visitors to navigate them through a purchase funnel over visits, unlike approaches that aim to optimize immediate rewards.

The present techniques can be utilized to generate personalized content that can be consumed by a user in various ways. This content can be shown to a user in the form of product recommendations, deals, etc. Thus, using the same logic and objective, the present techniques can be extended to create various systems that can personalize a website in different ways.

The present techniques can be utilized to formulate a reward in various ways by assigning weights to different parameters to be optimized on a website, like average time spent on the site, average order value, clickthrough rate, etc.

Similarly, the present techniques can be utilized to formulate a state and action space in various ways to optimize different objectives.

EXAMPLE ARCHITECTURE

FIG. 1 illustrates an example system architecture 100 that can facilitate personalizing user experience with neural fitted Q iteration, in accordance with certain embodiments of this disclosure.

As depicted, system architecture 100 comprises client computer 102, communications network 104, and computer system 106. In turn, computer system 106 comprises personalizing user experience with neural fitted Q-iteration component 108 and website information 110

Figure 10:
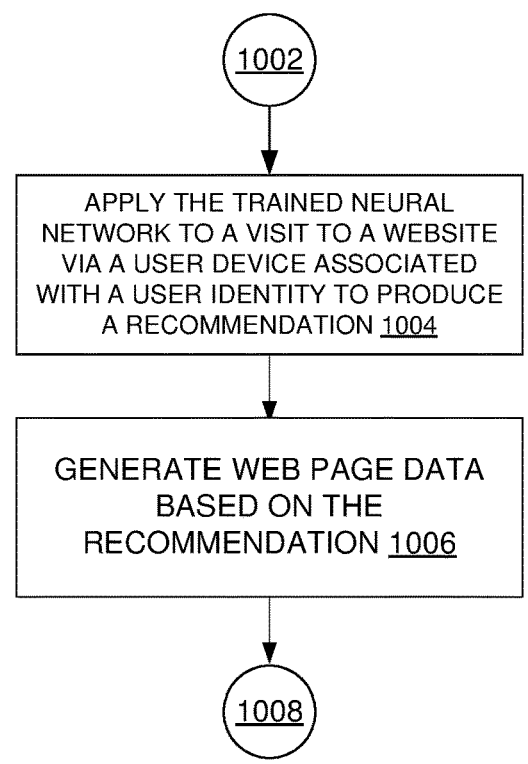
FIG. 10 illustrates another example process flow for generating a personalized web page to facilitate personalizing user experience with neural fitted Q iteration, in accordance with certain embodiments of this disclosure.

Each of client computer 102 and computer system 106 can be implemented with one or more instances of computer 1002 of FIG. 10. In some examples, personalizing user experience with neural fitted Q-iteration component 108 can be implemented with machine-executable instructions and/or part(s) of computer 1002 of FIG. 10. In some examples, website information can comprise computer data and/or machine executable instructions that are stored in a computer memory.

Communications network 104 can comprise a computer communications network, such as the Internet, or an isolated private computer communications network.

Client computer 102 can access computer system 106 via communications network 104. In some examples, client computer 102 can retrieve website information from computer system 106, which client computer 102 can use to render in a web browser and display in a graphical user interface of client computer 102.

Personalizing user experience with neural fitted Q-iteration component 108 can train a model to provide recommendations in website information that is sent to client computer 102. Examples of recommendations can include links to other web pages and products to purchase. Personalizing user experience with neural fitted Q-iteration component 108 can determine which recommendations to include based on personalizing these recommendations for a user identity associated with client computer 102. Personalizing user experience with neural fitted Q-iteration component 108 can generate a model used to determine recommendations by performing neural fitted Q-iteration training on a neural network to produce a trained model.

It can be appreciated that personalizing user experience with personalizing user experience with neural fitted Q-iteration component 108 is portrayed logically, and there can be different system architectures used to implement personalizing user experience with neural fitted Q iteration. For example, there can be a system architecture where a model is trained by a component that is separate from personalizing user experience with neural fitted Q-iteration component 108 and that executes on computer system that is separate from computer system 106. This component can then supply neural fitted Q-iteration component 108 with the trained model, and personalizing user experience with neural fitted Q-iteration component 108 can use the trained model to provide personalization.

Figure 6:
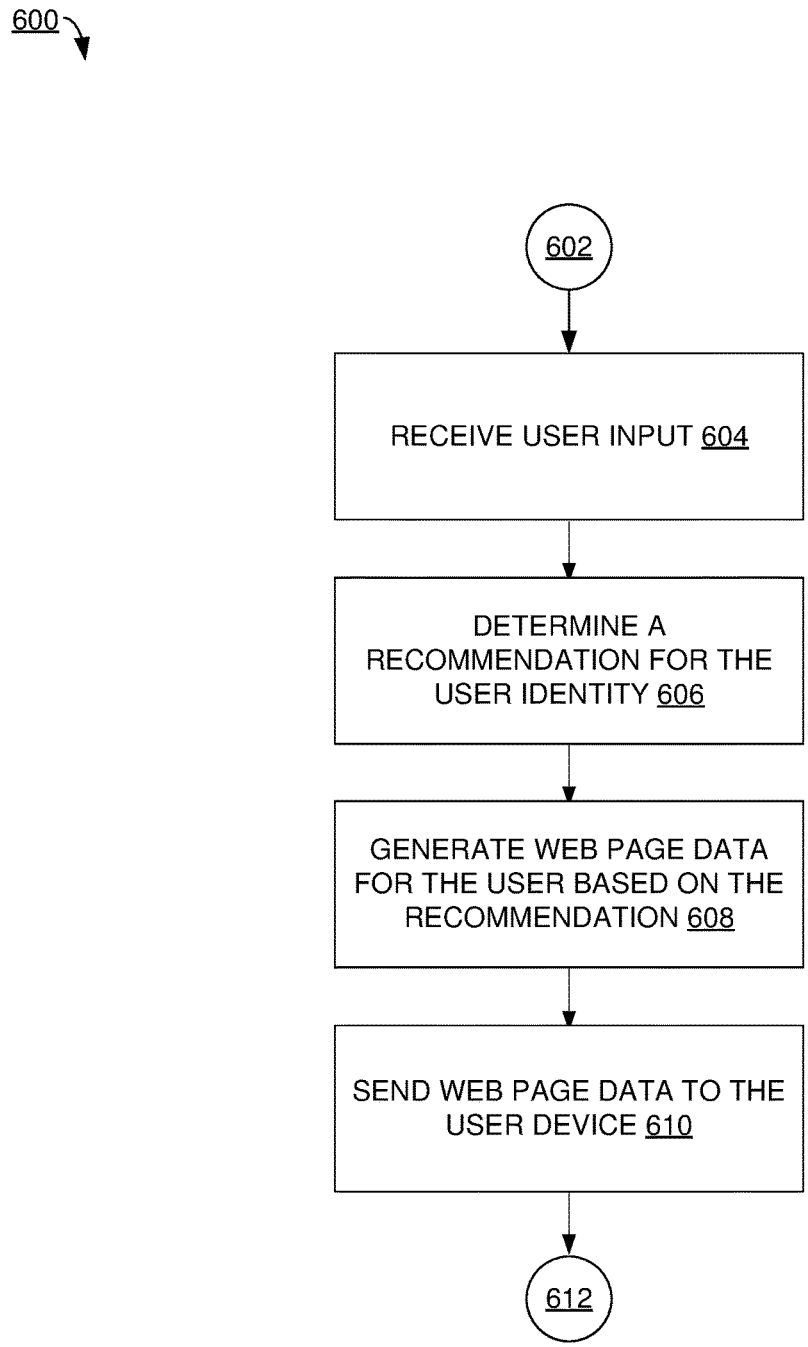
FIG. 6 illustrates an example process flow for training and using a personalization component that can facilitate personalizing user experience with neural fitted Q iteration, in accordance with certain embodiments of this disclosure.
Figure 7:
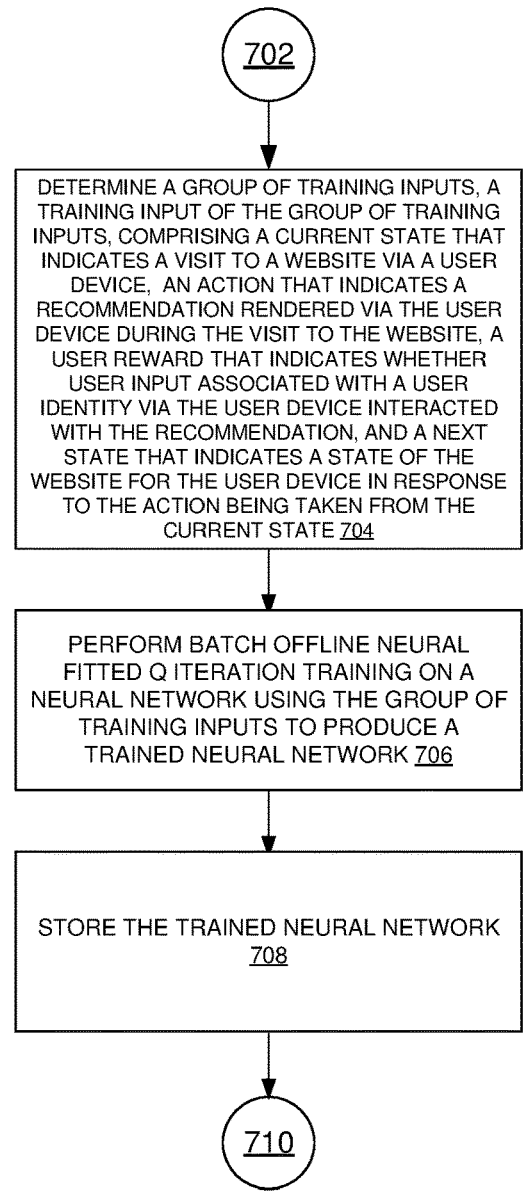
FIG. 7 illustrates an example process flow for personalizing user experience with neural fitted Q iteration, in accordance with certain embodiments of this disclosure.
Figure 8:
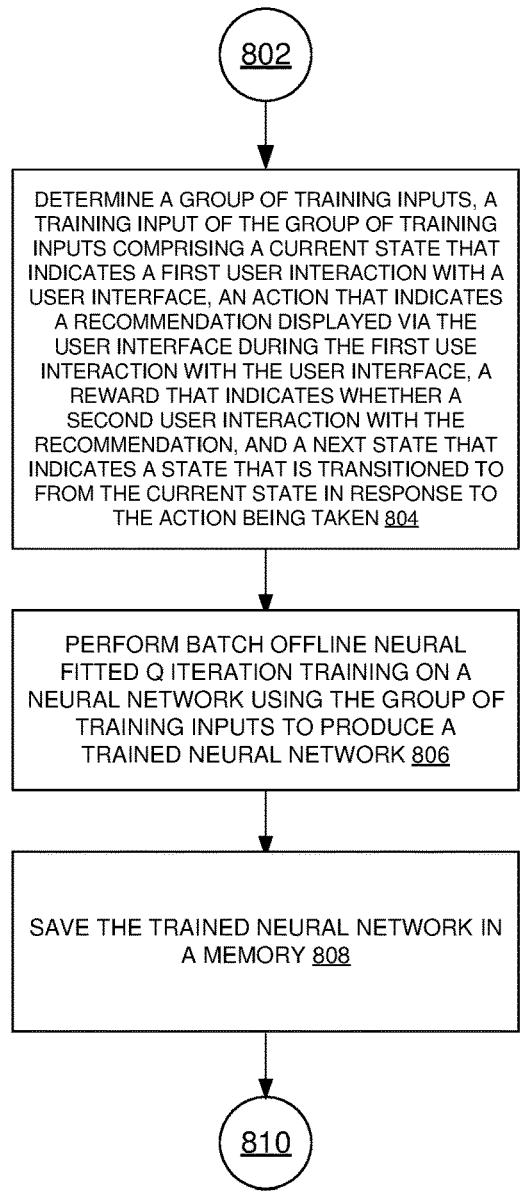
FIG. 8 illustrates another example process flow for personalizing user experience with neural fitted Q iteration, in accordance with certain embodiments of this disclosure.
Figure 9:
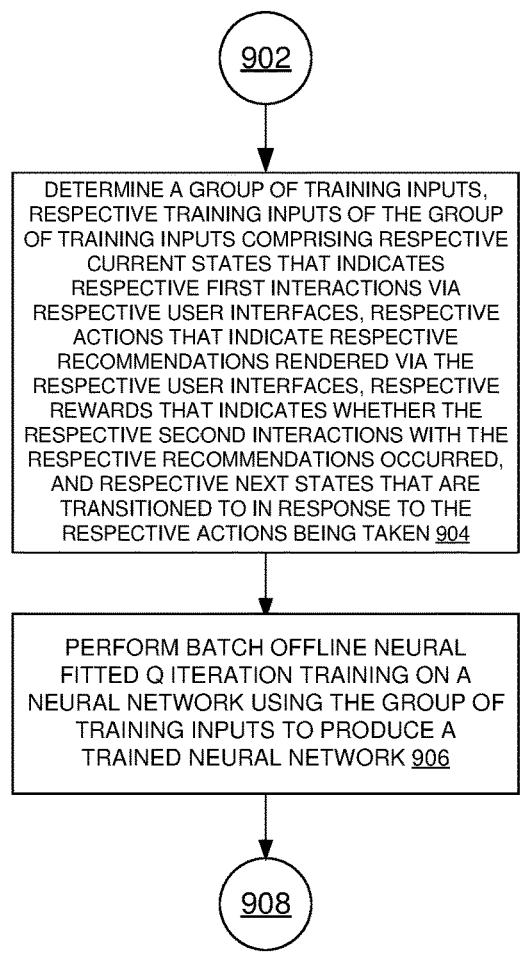
FIG. 9 illustrates another example process flow for personalizing user experience with neural fitted Q iteration, in accordance with certain embodiments of this disclosure.

In implementing personalizing user experience with neural fitted Q iteration in this manner, personalizing user experience with neural fitted Q-iteration component 108 can implement part(s) of process flow 600 of FIG. 6, process flow 700 of FIG. 7, process flow 800 of FIG. 8, process flow 900 of FIG. 9, and/or process flow 1000 of FIG. 10.

Figure 2:
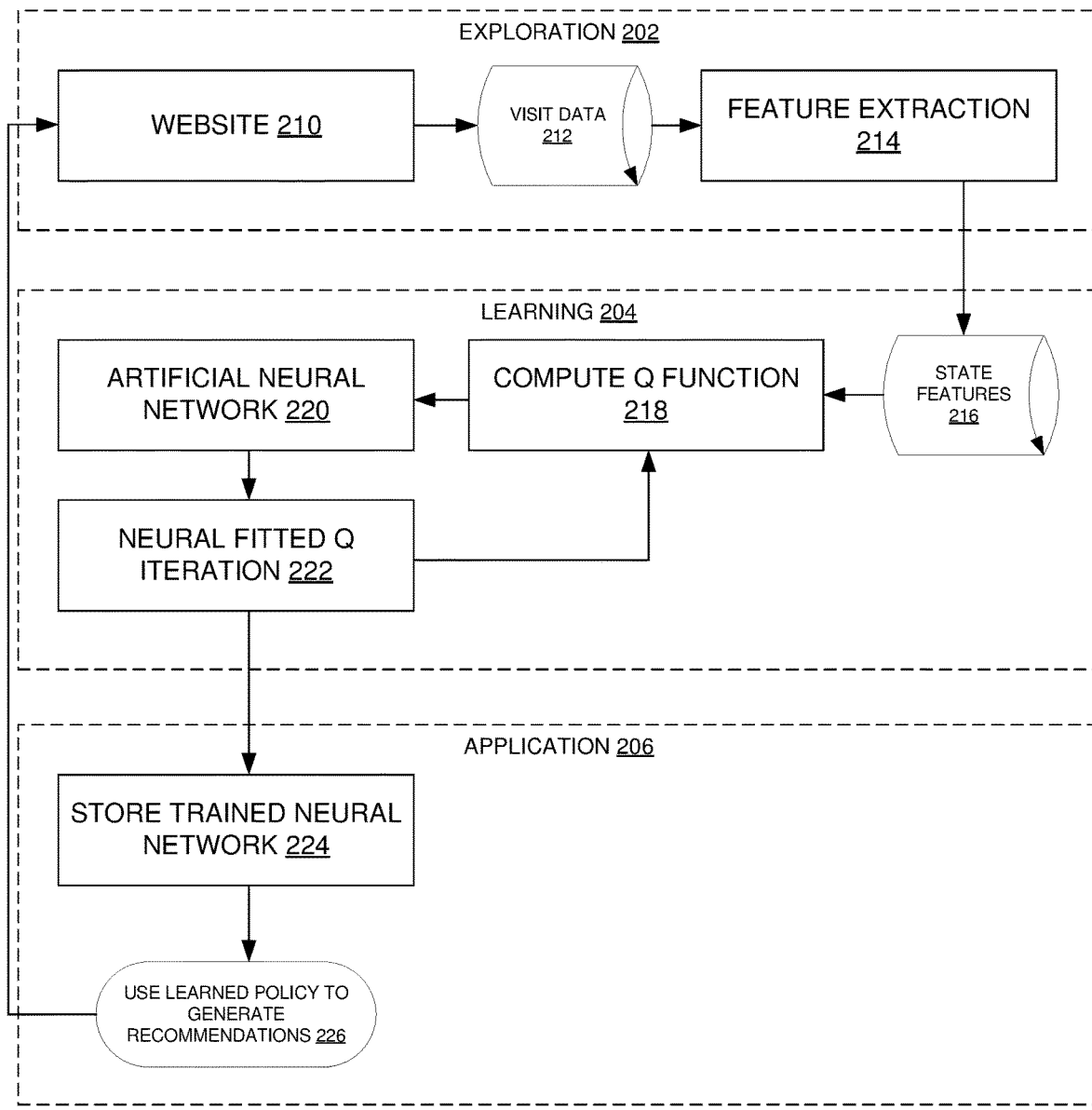
FIG. 2 illustrates an example system architecture for batch reinforcement learning that can facilitate personalizing user experience with neural fitted Q iteration, in accordance with certain embodiments of this disclosure.

FIG. 2 illustrates an example system architecture 200 for batch reinforcement learning that can facilitate personalizing user experience with neural fitted Q iteration, in accordance with certain embodiments of this disclosure. Batch reinforcement learning as depicted in system architecture 200 can be used as part of neural fitted Q iteration techniques.

System architecture 200 can be utilized to personalize user experience with neural fitted Q-iteration. System architecture 200 comprises exploration 202, learning 204, and application 206. In some examples, system architecture 200 can be used to implement aspects of personalizing user experience with neural fitted Q-iteration component 108 of FIG. 1.

As depicted in this example, there are three phases in a batch reinforcement learning task—exploration 202, learning 204, and application 206. In exploration 202, transitions in the form of (current state, action, reward, next state) can be collected from a real or simulated environment using a random sampling strategy. These transitions can be expressed as (s, a, r, s'). Exploration 202 can determine these transitions and supply them to learning.

Exploration 202 comprises website 210, visit data 212, and feature extraction 214. Website 210 can comprise data for one or more web pages that are rendered in a web browser to a user, and accept user input. As a user provides user input at a web page of website 210, this user input (e.g., which link was clicked on) can be stored as visit data 212. Features of visit data 212 can be extracted as feature extraction 214. Features in feature extraction 214 can include information such as a recentness of visit, a recurrence of visit, a time and day of the visit, and other demographic information about the user.

Features in feature extraction 214 can be stored as state features 216 in learning 204. Learning 204 can comprise state features 216, compute Q function 218, artificial neural network 220, and neural fitted Q iteration 222. From state features 216, iterations of compute Q function, artificial neural network 220, and neural fitted Q iteration 222 can be performed to incrementally learn a new Q-function and generate training patterns until convergence. This convergence can be a respective convergence of respective values of the Q-function.

In learning 204, an optimal policy can be learned from transitions. Learning 204 can output this policy to application 206. Learning 204 can pass a converged Q-function to application 206. Application 206 can accept the policy from learning 204 as input, and use the learned policy to generate output. This output can be personalized recommendations to a user to include in a web page.

Application 206 comprises store trained neural network 224 and use learned policy to generate recommendations 226. Store trained neural network 224 can comprise a version of the neural network trained in learning 204 that is stored in a computer memory. Use learned policy to generate recommendations 226 can utilize the neural network stored in store trained neural network to generate recommendations to be included in a web page, and these generated recommendations can be used to generate data for website 210.

Figure 3:
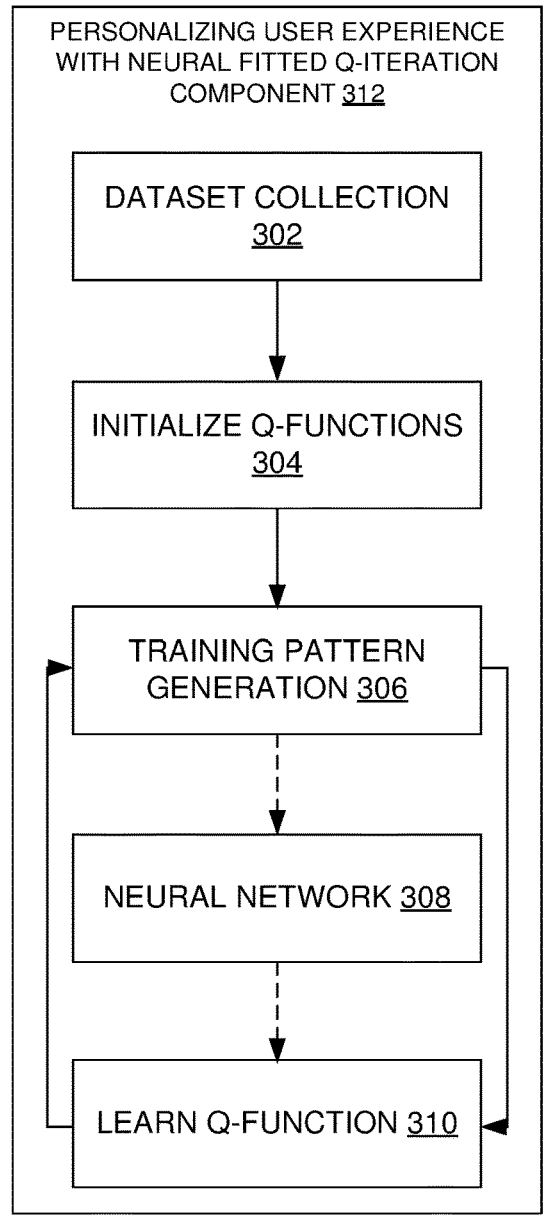
FIG. 3 illustrates an example system architecture for training using neural fitted Q iteration that can facilitate personalizing user experience with neural fitted Q iteration, in accordance with certain embodiments of this disclosure.

FIG. 3 illustrates an example system architecture 300 for training using neural fitted Q iteration that can facilitate personalizing user experience with neural fitted Q iteration, in accordance with certain embodiments of this disclosure.

System architecture 300 comprises personalizing user experience with neural fitted Q-iteration component 312. In turn, personalizing user experience with neural fitted Q-iteration component 312 comprises dataset collection 302, initialize Q-functions 304, training pattern generation 306, neural network 308, and learn Q-function 310. In some examples, personalizing user experience with neural fitted Q-iteration component 312 can be similar to personalizing user experience with neural fitted Q-iteration component 108 of FIG. 1.

Dataset collection 302 can comprise collecting several different customer trajectories in interacting with a website. Each trajectory can comprise one or more transitions in the form of (current state, action, reward, next state), which can be expressed as (s, a, r, s').

Where a dataset is collected in dataset collection 302, initialize Q-functions 304 can initialize one or more Q-functions. This initializing can include both initializing Q-functions as well as weights of a neural network (e.g., neural network 308).

Then, training pattern generation 306 can perform training on neural network 308. An input can be one or more trajectories (e.g., (s, a, r, s')) and a target can be expressed as $r+\gamma*(Q(s', a))$.

Neural network 308 can comprise a computer representation of one or more nodes and one or more connections between the nodes. A node can provide an output to another node via a connection between those nodes, and this second node can use that as input to determine the second node's own output. Each node can implement a function to determine an output from the input(s). A weight in a neural network can affect (e.g., increase or decrease) the value of an output of a node, and a neural network can have multiple weights corresponding to multiple respective nodes. Once trained, neural network 308 can be implemented to determine personalized recommendations for a user.

Learn Q-function 310 incrementally learns a new Q-function and generates training patterns until convergence. This convergence can be a respective convergence of respective values of the Q-function.

Iterations of training pattern generation 306 and learn Q-function 310 can be performed with neural network 308 until convergence.

FIG. 4 illustrates another example system architecture 400 for training using neural fitted Q iteration that can facilitate personalizing user experience with neural fitted Q iteration, in accordance with certain embodiments of this disclosure.

System architecture 400 comprises personalizing user experience with neural fitted Q-iteration component 408, which in turn comprises computer logic 402. In some examples, personalizing user experience with neural fitted Q-iteration component 408 can be similar to personalizing user experience with neural fitted Q-iteration component 108 of FIG. 1. In some examples, computer logic 402 can comprise computer data and/or machine executable instructions that are stored in a computer memory.

As depicted, computer logic 402 expresses the following in pseudocode:

---

Inputs: a batch of transitions D, in the form of four-tuples (s,a,r,s') describing user visits to website
Outputs: Q-value function $Q_N$
Initialization:
    Set k = 0
    Set initial Q-value function $Q_0$ to zero across S × A
Iterations:
    Repeat until convergence criteria or stopping conditions (k > N) are met
        Generate training patterns P = {($input_l$, $target_l$),
        l = 1,2,...,#D} where:
            $input_l = (s_l, a_l)$
            $s_l = (g_l^1, g_l^2,..., g_l^m)$, where m denotes number of state features used to represent vist to website
            $a_l$ = a, where array[a] fetches a sequence of recommendations to
            be shown of the form $(oc_l^1, oc_l^2, oc_l^3, oc_l^4)$ from an array of all
            possible permutations of recommendation sequences based on product order codes (oc).
            $target_l = r_l + \gamma * max_b(Q_K, b)$ where b represents all possible actions
    Train Artificial Neural Network to induce from training pattern P (input, target) the Q-function $Q_N$
    k = k + 1
    Store trained Artifical Neural Network and generate recommendations.

---

Computer logic 402 can be implemented to perform neural fitted Q iterations, such as iterations of training pattern generation 306 and learn Q-function 310 in FIG. 3.

Figure 5:
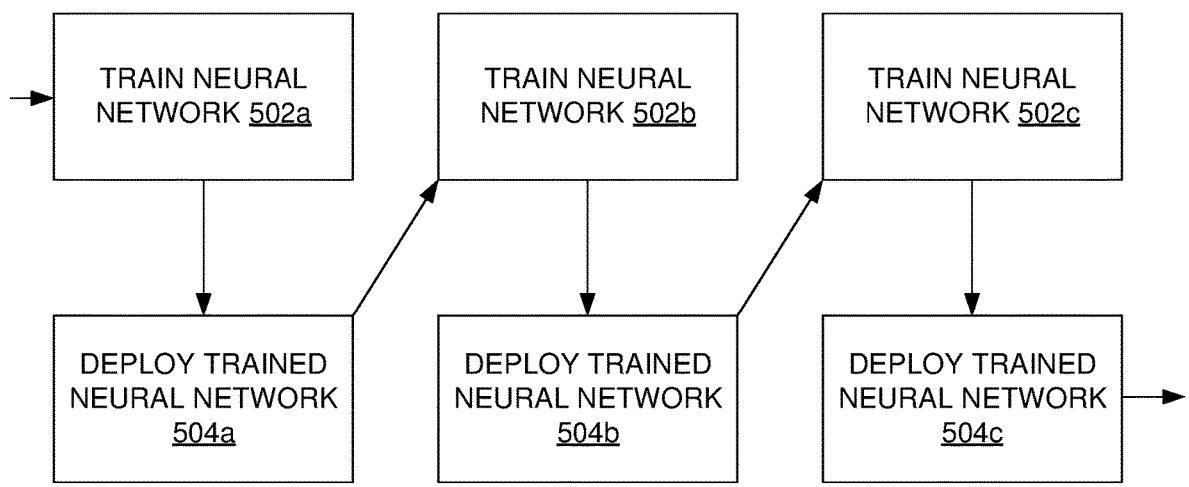
FIG. 5 illustrates an example system architecture for incrementally training using neural fitted Q iteration that can facilitate personalizing user experience with neural fitted Q iteration, in accordance with certain embodiments of this disclosure.

FIG. 5 illustrates an example system architecture 500 for incrementally training using neural fitted Q iteration that can facilitate personalizing user experience with neural fitted Q iteration, in accordance with certain embodiments of this disclosure.

In system architecture 500, iterations of training and deploying a neural network can be performed. While the example of system architecture 500 depicts three such iterations, it can be appreciated that there are examples that implement different numbers of iterations, include periodically performing an iteration as new data is received for an indefinite amount of time.

System architecture 500 comprises train neural network 502a, deploy trained neural network 504a, train neural network 502b, deploy trained neural network 504b, train neural network 502c, and deploy trained neural network 504c. Each of train neural network 502a can comprise training a neural network, similar to learning 204 of FIG. 2. After an iteration of training a neural network is performed, the neural network can be deployed, in deploy trained neural network 504a, deploy trained neural network 504b, and deploy trained neural network 504c.

A deployed trained neural network can be used to generate personalized recommendations for websites (similar to website 210 of FIG. 2). As a user interacts with such a website, information on these interactions can be determined (similar to visit data 212), and this new data can be used to further train the neural network. In this manner, a quality of recommendations produced by the trained neural network can be improved over time.

Example Process Flows

FIG. 6 illustrates an example process flow 600 for training and using a personalization component that can facilitate personalizing user experience with neural fitted Q iteration, in accordance with certain embodiments of this disclosure. In some examples, one or more embodiments of process flow 600 can be implemented by personalizing user experience with neural fitted Q-iteration component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 600 begins with 602, and moves to operation 604. Operation 604 depicts receiving user input. This can be user input to a web browser on client computer 102 of FIG. 1 that is sent via communications network 104 and received at computer system 106. In some examples, this user input can be indicative of navigating to a web page, or interacting with a user interface element on a web page. After operation 604, process flow 600 moves to operation 606.

Operation 606 depicts determining a recommendation for the user identity. This recommendation can be determined by personalizing user experience with neural fitted Q-iteration component 108 of FIG. 1 and based on a user identity associated with the user input of operation 604. After operation 606, process flow 600 moves to operation 608.

Operation 608 depicts generating web page data for the user based on the recommendation. This web page can be generated by computer system 106, and incorporate the recommendation determined in operation 606. For example, the recommendation can comprise links to products, and the web page can be generated to incorporate these links to products at a predetermined location within the web page data. This web page data can be utilized by a web browser to render a web page. After operation 608, process flow 600 moves to operation 610.

Operation 610 depicts sending web page data to the user device. This can comprise computer system 106 of FIG. 1 sending web page data via communications network 104 to client computer 102. Client computer 102 can receive this web page data and use it to render a corresponding web page in a web browser window. After operation 610, process flow 600 moves to 612, where process flow 600 ends.

As the user identity continues to interact with a web site served by computer system 106, further iterations of process flow 600 can be performed to provide personalized recommendations in web pages.

FIG. 7 illustrates an example process flow 700 for personalizing user experience with neural fitted Q iteration, in accordance with certain embodiments of this disclosure. In some examples, one or more embodiments of process flow 700 can be implemented by personalizing user experience with neural fitted Q-iteration component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704. Operation 704 depicts determining a group of training inputs, a training input of the group of training inputs, comprising a current state that indicates a visit to a website via a user device, an action that indicates a recommendation rendered via the user device during the visit to the website, a user reward that indicates whether user input associated with a user identity via the user device interacted with the recommendation, and a next state that indicates a state of the website for the user device in response to the action being taken from the current state.

In some examples, the group of training inputs comprises pairs, wherein the pairs comprise respective input values and respective targets. That is, training inputs used to train a neural network can take the form of (input, target).

In some examples, the group of training inputs comprises pairs, wherein the pairs comprise respective input values and respective targets, and wherein a respective target of the respective targets of a pair of the pairs comprises a sum of a reward and an expected minimal path cost for a second state. That is, a target can indicate a reward that corresponds to the input taken, where training a neural network can comprise attempting to increase an amount of rewards acquired. In some examples, the expected minimal path cost for the second state is determined based on a current estimate of a Q-function of the batch offline neural fitted Q iteration training.

After operation 704, process flow 700 moves to operation 706.

Operation 706 depicts performing batch offline neural fitted Q iteration training on a neural network using the group of training inputs to produce a trained neural network.

In some examples, a Q-function of the batch offline neural fitted Q iteration training is modeled in accordance with a multi-layer perceptron model. That is, a multi-layer perceptron model can be utilized according to the present techniques.

After operation 706, process flow 700 moves to operation 708.

Operation 708 depicts storing the trained neural network. This can comprise storing the trained neural network in a computer memory, such as a computer memory of computer system 106 of FIG. 1 such that the stored, trained neural network is accessible by personalizing user experience with neural fitted Q-iteration component 108

In some examples the user identity is a first user identity, wherein the visit is a first visit, wherein the user device is a first user device, wherein the recommendation is a first recommendation. In such examples, operation 708 can comprise applying the trained neural network to a second visit to the website via a second user device associated with a second user identity to produce a second recommendation, generating web page data based on the second recommendation. That is, the trained neural network can be used to generate recommendations for personalized web pages for users.

In some examples, operation 708 comprises periodically retraining the trained neural network based on user interactions with the website that occur subsequent to the performing the producing of the trained neural network. That is, the trained neural network can be incrementally deployed, and retrained over time as new user interactions are observed, which can be used as input data for continuing to train the neural network.

After operation 708, process flow 700 moves to 710, where process flow 700 ends.

FIG. 8 illustrates another example process flow 800 for personalizing user experience with neural fitted Q iteration, in accordance with certain embodiments of this disclosure. In some examples, one or more embodiments of process flow 800 can be implemented by personalizing user experience with neural fitted Q-iteration component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804. Operation 804 depicts determining a group of training inputs, a training input of the group of training inputs comprising a current state that indicates a first user interaction with a user interface, an action that indicates a recommendation displayed via the user interface during the first use interaction with the user interface, a reward that indicates whether a second user interaction with the recommendation, and a next state that indicates a state that is transitioned to from the current state in response to the action being taken. In some examples, operation 804 can be implemented in a similar manner as operation 704 of FIG. 7.

In some examples, the reward comprises a first value corresponding to the second user interaction with the recommendation, and a second value corresponding to the second user interaction with the recommendation not having occurred, the first value being greater than the second value. For example, the reward can be 1 when the user clicks on a recommendation, and 0 when the user does not. In other examples, the reward can be an amount that the user pays a proprietor of the user interface (e.g., a company that provides a web site rendered as a web page in the user interface) as a result of clicking on, or otherwise interacting with, the recommendation.

In some examples, the group of training inputs comprises sampled values of rewards and sampled values of actions. That is, in some examples, the rewards and actions can be sampled, in contrast to a true distribution.

In some examples, the current state comprises a feature vector. In some examples, features of the feature vector identify characteristics of the first user interaction with the user interface.

After operation 804, process flow 800 moves to operation 806.

Operation 806 depicts performing batch offline neural fitted Q iteration training on a neural network using the group of training inputs to produce a trained neural network. In some examples, operation 806 can be implemented in a similar manner as operation 706 of FIG. 7.

In some examples, operation 806 comprises determining a policy that maximizes expected rewards, wherein the policy comprises a mapping from states to actions that denotes a probability, for each defined action of the actions, of taking the defined action while the user interface is in a defined state.

In some examples, operation 806 comprises performing iterations of the batch offline neural fitted Q iteration training until a Q function of the batch offline neural fitted Q iteration training converges on a defined value.

After operation 806, process flow 800 moves to operation 808.

Operation 808 depicts saving the trained neural network in a memory. In some examples, operation 808 can be implemented in a similar manner as operation 708 of FIG. 7.

After operation 808, process flow 800 moves to 810, where process flow 800 ends.

FIG. 9 illustrates another example process flow 900 for personalizing user experience with neural fitted Q iteration, in accordance with certain embodiments of this disclosure. In some examples, one or more embodiments of process flow 900 can be implemented by personalizing user experience with neural fitted Q-iteration component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, and/or process flow 1000 of FIG. 10.

Process flow 900 begins with 902, and moves to operation 904. Operation 904 depicts determining a group of training inputs, respective training inputs of the group of training inputs comprising respective current states that indicates respective first interactions via respective user interfaces, respective actions that indicate respective recommendations rendered via the respective user interfaces, respective rewards that indicates whether the respective second interactions with the respective recommendations occurred, and respective next states that are transitioned to in response to the respective actions being taken. In some examples, operation 904 can be implemented in a similar manner as operation 704 of FIG. 7.

In some examples, the respective current states indicate at least one of respective numbers of visits to the respective user interfaces, or respective previous rewards generated from respective previous interactions with the respective user interfaces prior to the respective first interactions.

In some examples, the respective current states indicate respective sums of rewards generated as a result of the respective first interactions and respective previous interactions with the respective user interfaces previous to the respective first interactions, or respective revenues generated by respective last purchases as a result of the respective first interactions or the respective previous interactions.

In some examples, the respective current states indicate at least one of respective average amounts of time spent as a result of the respective first interactions with the respective user interfaces, or respective numbers of times respective ones of the respective recommendations have been rendered via the respective user interfaces.

In some examples, the respective current states indicate at least one of respective days of the week of the respective first interactions, respective hours of the respective days, respective geographical locations associated with the respective first interactions with the respective user interfaces, or respective demographic information associated with the respective first interactions with the respective user interfaces.

In some examples, the respective current states indicate at least one of respective types of devices utilized for the respective first interactions with the respective user interfaces, or respective operating systems of the devices utilized for the respective first interactions.

After operation 904, process flow 900 moves to operation 906.

Operation 906 comprises performing batch offline neural fitted Q iteration training on a neural network using the group of training inputs to produce a trained neural network. In some examples, operation 906 can be implemented in a similar manner as operation 706 of FIG. 7.

After operation 906, process flow 900 moves to 908, where process flow 900 ends.

FIG. 10 illustrates another example process flow 1000 for generating a personalized web page to facilitate personalizing user experience with neural fitted Q iteration, in accordance with certain embodiments of this disclosure. In some examples, one or more embodiments of process flow 1000 can be implemented by personalizing user experience with neural fitted Q-iteration component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, and/or process flow 900 of FIG. 9.

Process flow 1000 begins with 1002, and moves to operation 1004. Operation 1004 depicts applying the trained neural network to a visit to a website via a user device associated with a user identity to produce a recommendation. In some examples, a trained neural network can have been produced, such as via process flow 700 of FIG. 7, process flow 800 of FIG. 8, or process flow 900 of FIG. 9. That trained neural network can be utilized to create a personalized website (or user interface) when a particular user identity visits that website.

After operation 1004, process flow 1000 moves to operation 1006.

Operation 1006 depicts generating web page data based on the recommendation. This web page data can include a presentation of the recommendation—such as a link or an image. This web page data can then be sent to the user device via a communications network, where the user device can then render a web page in a web browser based on the web page data.

After operation 1006, process flow 1000 moves to 1008, where process flow 1000 ends.

Example Operating Environment

Figure 11:
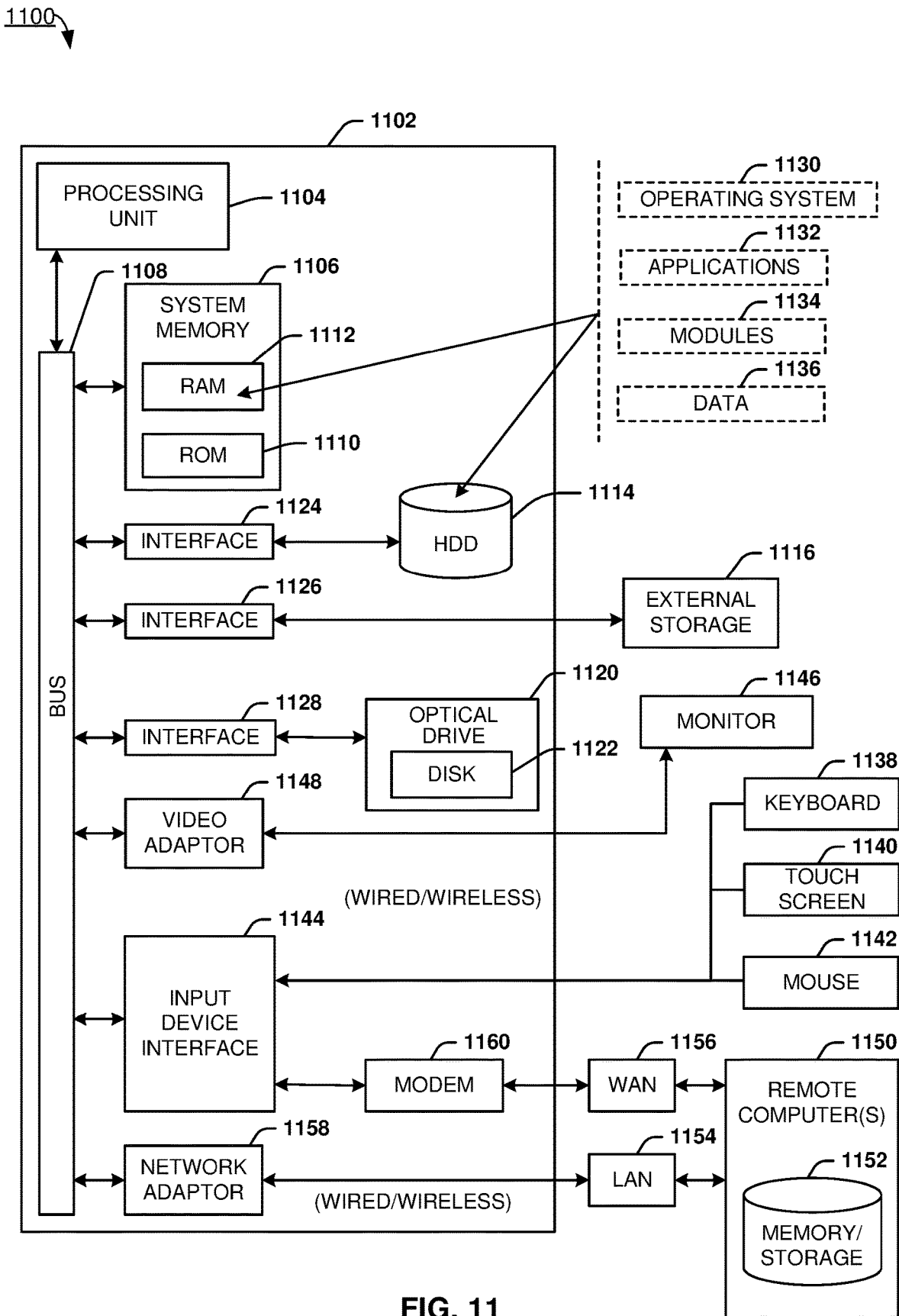
FIG. 11 illustrates an example block diagram of a computer operable to execute certain embodiments of this disclosure.

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of client computer 102, computer system 106, and/or personalizing user experience with neural fitted Q-iteration component 108 of FIG. 1. In some examples, computing environment 1100 can implement one or more embodiments of the process flows of FIGS. 7-10 to facilitate automatic identification of computer agents for throttling.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    at least one memory that stores executable instructions that, when executed by the at least one processor, facilitate performance of operations, comprising:
        determining a group of training inputs, a training input of the group of training inputs comprising:
            a current state that indicates a visit to a website via a user device, and indicates a sum of rewards generated as a result of the visit and a previous visit to the website, or a revenue generated by a last purchase as a result of the visit or the previous visit;
            an action that indicates a recommendation rendered via the user device during the visit to the website,
            a user reward that indicates whether user input associated with a user identity via the user device interacted with the recommendation, and
            a next state that indicates a state of the website for the user device in response to the action being taken from the current state;
        performing batch offline neural fitted Q iteration training on a neural network using the group of training inputs to produce a trained neural network; and
        storing the trained neural network.

2. The system of claim 1, wherein the user identity is a first user identity, wherein the visit is a first visit, wherein the user device is a first user device, wherein the recommendation is a first recommendation, and wherein the operations further comprise:
    applying the trained neural network to a second visit to the website via a second user device associated with a second user identity to produce a second recommendation; and
    generating web page data based on the second recommendation.

3. The system of claim 1, wherein the operations further comprise:
    periodically retraining the trained neural network based on user interactions with the website that occur subsequent to the performing the producing of the trained neural network.

4. The system of claim 1, wherein the group of training inputs comprises pairs, wherein the pairs comprise respective input values and respective targets.

5. The system of claim 1, wherein the group of training inputs comprises pairs, wherein the pairs comprise respective input values and respective targets, and wherein a respective target of the respective targets of a pair of the pairs comprises a sum of a reward and an expected minimal path cost for a second state.

6. The system of claim 5, wherein the expected minimal path cost for the second state is determined based on a current estimate of a Q-function of the batch offline neural fitted Q iteration training.

7. The system of claim 1, wherein a Q-function of the batch offline neural fitted Q iteration training is modeled in accordance with a multi-layer perceptron model.

8. A method, comprising:
    determining, by a system comprising at least one processor, a group of training inputs, a training input of the group of training inputs comprising a current state that indicates a first user interaction with a user interface, an action that indicates a recommendation displayed via the user interface during the first use interaction with the user interface, a reward that indicates whether a second user interaction with the recommendation, and a next state that indicates a state that is transitioned to from the current state in response to the action being taken, wherein the current state indicates a sum of rewards generated as a result of the first user interaction and a previous interaction with the user interface previous to the first user interaction, or a revenue generated by a last purchase as a result of the first user interaction or the previous interaction;

performing, by the system, batch offline neural fitted Q iteration training on a neural network using the group of training inputs to produce a trained neural network; and saving, by the system, the trained neural network in a memory.

9. The method of claim 8, wherein the reward comprises a first value corresponding to the second user interaction with the recommendation, and a second value corresponding to the second user interaction with the recommendation not having occurred, the first value being greater than the second value.

10. The method of claim 8, wherein the performing of the batch offline neural fitted Q iteration training on the neural network comprises:

determining a policy that maximizes expected rewards, wherein the policy comprises a mapping from states to actions that denotes a probability, for each defined action of the actions, of taking the defined action while the user interface is in a defined state.

11. The method of claim 8, wherein the performing of the batch offline neural fitted Q iteration training comprises:

performing iterations of the batch offline neural fitted Q iteration training until a Q function of the batch offline neural fitted Q iteration training converges on a defined value.

12. The method of claim 8, wherein the group of training inputs comprises sampled values of rewards and sampled values of actions.

13. The method of claim 8, wherein the current state comprises a feature vector.

14. The method of claim 13, wherein features of the feature vector identify characteristics of the first user interaction with the user interface.

15. A non-transitory computer-readable medium comprising instructions that, in response to execution, cause a system comprising at least one processor to perform operations, comprising:

determining a group of training inputs, respective training inputs of the group of training inputs comprising respective current states that indicates respective first interactions via respective user interfaces, respective actions that indicate respective recommendations rendered via the respective user interfaces, respective rewards that indicates whether the respective second interactions with the respective recommendations occurred, and respective next states that are transitioned to in response to the respective actions being taken, wherein the respective current states indicate respective sums of rewards generated as a result of the respective first interactions and respective previous interactions with the respective user interfaces previous to the respective first interactions, or respective revenues generated by respective last purchases as a result of the respective first interactions or the respective previous interactions; and performing batch offline neural fitted Q iteration training on a neural network using the group of training inputs to produce a trained neural network.

16. The non-transitory computer-readable medium of claim 15, wherein the respective current states indicate at least one of respective numbers of visits to the respective user interfaces, or respective previous rewards generated from respective previous interactions with the respective user interfaces prior to the respective first interactions.

17. The non-transitory computer-readable medium of claim 15, wherein the respective current states indicate at least one of respective average amounts of time spent as a result of the respective first interactions with the respective user interfaces, or respective numbers of times respective ones of the respective recommendations have been rendered via the respective user interfaces.

18. The non-transitory computer-readable medium of claim 15, wherein the respective current states indicate at least one of respective days of the week of the respective first interactions, respective hours of the respective days, respective geographical locations associated with the respective first interactions with the respective user interfaces, or respective demographic information associated with the respective first interactions with the respective user interfaces.

19. The non-transitory computer-readable medium of claim 15, wherein the respective current states indicate at least one of respective types of devices utilized for the respective first interactions with the respective user interfaces, or respective operating systems of the devices utilized for the respective first interactions.

20. The non-transitory computer-readable medium of claim 15, wherein the operations further comprise:

periodically retraining the trained neural network based on user interactions with the website that occur subsequent to the performing the producing of the trained neural network.

* * * * *